(12) United States Patent
Verin et al.

(10) Patent No.: US 11,235,503 B2
(45) Date of Patent: Feb. 1, 2022

(54) BARRIER FILM WITH ENHANCED FORMABILITY AND A METHOD FOR MAKING THEREOF

(71) Applicant: OBSCHESTVO S OGRANICHENNOI OTVETSTVENNOSTYU PROIZVODSTVENNO-KOMMERCHESKAYA FIRMA "ATLANTIS-PAK", Aksayski rayon Rostovskaya oblast (RU)

(72) Inventors: Sergey Vladimirovich Verin, g. Rostov-na-Donu (RU); Vladimir Vladimirovich Kostrub, g. Rostov-na-Donu (RU); Vadim Yurievich Biryukov, g. Rostov-na-Donu (RU); Igor Vladimirovich Burykin, g. Rostov-na-Donu (RU); Boris Vladimirovich Golyanskiy, g. Rostov-na-Donu (RU)

(73) Assignee: OBSCHESTVO S OGRANICHENNOI OTVETSTVENNOSTYU "PROIZVODSTVENNO-KOMMERCHESKAVA EIRMNA ATI ANTIR-PAK", Aksayski rayon Rostovskaya oblast (RU)

( * ) Notice: Subject to any disclaimer, the term of this patent is extended or adjusted under 35 U.S.C. 154(b) by 159 days.

(21) Appl. No.: 16/625,651

(22) PCT Filed: Aug. 28, 2018

(86) PCT No.: PCT/RU2018/000569
§ 371 (c)(1),
(2) Date: Dec. 20, 2019

(87) PCT Pub. No.: WO2019/066684
PCT Pub. Date: Apr. 4, 2019

(65) Prior Publication Data
US 2021/0154904 A1    May 27, 2021

(30) Foreign Application Priority Data
Sep. 29, 2017 (RU) ............................... 2017134028

(51) Int. Cl.
*B29C 48/08* (2019.01)
*B29C 48/28* (2019.01)
(Continued)

(52) U.S. Cl.
CPC .......... *B29C 48/08* (2019.02); *B29C 48/0018* (2019.02); *B29C 48/21* (2019.02);
(Continued)

(58) Field of Classification Search
CPC ......... B29C 48/08; B29C 48/28; B29C 48/21; B29C 48/0018; B29C 48/91; B32B 7/12;
(Continued)

(56) References Cited

U.S. PATENT DOCUMENTS 5,077,109 A    12/1991  Lustig et al.
6,699,549 B1    3/2004  Ueyama et al.
(Continued)

FOREIGN PATENT DOCUMENTS

EP    2233285 A1    9/2010
EP    1985444 B1    3/2014
(Continued)

*Primary Examiner* — Michael C Miggins
(74) *Attorney, Agent, or Firm* — Smartpat PLC

(57) ABSTRACT

A film comprises an outer heat sealable layer mainly made of a (co)polyolefin with the Vicat softening temperature not exceeding 130° C., at least one heat resistant layer mainly made of at least one polar (co)polymer selected from the group including predominantly aliphatic (co)polyamides and aromatic (co)polyesters, and at least one core adhesive
(Continued)

layer from a material capable of adhering both to (co)polyolefins and to polar (co)polymers. The heat resistant layer comprises not less than 15% of at least one predominantly aliphatic copolyamide with the melting temperature not exceeding 205° C. A method comprises the stages of coextrusion, biaxial stretching, annealing and winding up of the resulting film into a roll.

15 Claims, 1 Drawing Sheet

(51) Int. Cl.
    *B29C 48/21* (2019.01)
    *B29C 48/00* (2019.01)
    *B29C 48/91* (2019.01)
    *B32B 7/12* (2006.01)
    *B32B 27/08* (2006.01)
    *B32B 27/30* (2006.01)
    *B32B 27/32* (2006.01)
    *B32B 27/34* (2006.01)
    *B32B 27/36* (2006.01)

(52) U.S. Cl.
    CPC .............. *B29C 48/28* (2019.02); *B29C 48/91* (2019.02); *B32B 7/12* (2013.01); *B32B 27/08* (2013.01); *B32B 27/306* (2013.01); *B32B 27/308* (2013.01); *B32B 27/32* (2013.01); *B32B 27/34* (2013.01); *B32B 27/36* (2013.01); *B32B 2250/03* (2013.01); *B32B 2250/04* (2013.01); *B32B 2250/05* (2013.01); *B32B 2250/24* (2013.01); *B32B 2307/306* (2013.01); *B32B 2307/31* (2013.01); *B32B 2307/518* (2013.01); *B32B 2307/736* (2013.01)

(58) Field of Classification Search
    CPC ..... B32B 27/08; B32B 27/306; B32B 27/308; B32B 27/32; B32B 27/34; B32B 27/36; B32B 2250/03; B32B 2250/04; B32B 2250/05; B32B 2250/24; B32B 2307/306; B32B 2307/31; B32B 2307/518; B32B 2307/736
    See application file for complete search history.

(56) References Cited

U.S. PATENT DOCUMENTS

| | | |
|---|---|---|
| 7,018,719 B2 | 3/2006 | Ueyama et al. |
| 7,993,713 B2 | 8/2011 | Ishii et al. |
| 2009/0136726 A1 | 5/2009 | Ishii et al. |
| 2017/0066228 A1 | 3/2017 | Fusarpoli et al. |

FOREIGN PATENT DOCUMENTS

| | | |
|---|---|---|
| JP | 03535733 | 12/2003 |
| JP | 2010070217 A | 4/2010 |
| RU | 2245058 C2 | 1/2005 |
| WO | 2015107127 A1 | 7/2015 |

BARRIER FILM WITH ENHANCED FORMABILITY AND A METHOD FOR MAKING THEREOF

FIELD OF THE INVENTION

The present invention relates to multilayer moisture- and gas-barrier relatively thick-walled thermoformable films made of synthetic polymers and characterized with evener distribution of thickness after a tensile deformation during the thermoforming in comparison with films known from the prior art. Such films on the one hand can be quite deeply deformed without ruptures and, on the other, formed without excessive local thinning-down.

BACKGROUND OF THE INVENTION

Over the last decades an art of automatic packaging for goods of food or non-food nature has been being developed intensively. In a variant of packaging process filled with food trays or containers lidded and sealed by lidding film are made. Apart from this lidding or top film, a so called bottom film is used, which is intended to be transformed into soft trays or containers by the same packaging apparatus.

The said bottom film, like the lidding film, is usually characterized with vapor and gas-barrier properties, but it is much thicker than the top film, because the bottom film is required to be far stronger and more reliable mechanically.

Typically, said bottom film has a multilayer structure, which comprises layers imparting thereto a desirable set of characteristics. Layers out of different polyolefins are usually responsible for the moisture-barrier properties and heat sealability of a film. A layer that mostly determines gas-barrier (mostly oxygen-barrier) properties of a film is usually formed out of ethylene/vinyl alcohol copolymer (EVOH), comprising about 20 to 50% of ethylene units. The layers based on polyamides (nylons) are reasonable for mechanical strength and reliability of the bottom film. They also additionally enhance oxygen-barrier properties of the film and its performance characteristics in process of forming, filling and sealing of prepared trays as well as during transportation of filled packages. Layers based on aromatic polyester such as polyethylene terephthalate (PET) also can improve performance characteristics of a film in process of production and transport of filled packages and still they can provide the film and formed articles with well abuse protection (scratch resistance). In addition layers out of polymeric adhesive materials typically, being polyolefins modified by active groups for instance of acid-, anhydride- or epoxide-type, can provide adhesion between layers from materials having low mutual affinity such as on the one hand polyolefins and polar polymers for instance polyamides, polyesters or EVOH on the other hand.

The formability of the bottom film implies it is characterized by sufficiently high plasticity and mechanical pliability (i.e. ability of being significantly and irreversibly deformed under relatively low stresses) preferably manifested at elevated temperature. As a rule, forming a few closely located formed items from a single film, so that a projection of the items covers more than 70% of the film area, is most problematic. Such forming conditions are hereinafter referred to as 'severe conditions'. The bottom films should also meet another important requirement of having as low as possible values of heat shrinkage at forming temperature, i.e. at a short-time heating in dry air up to temperature about 90 to 120° C. (hereinafter referred to as 'dry heating'). Otherwise, the formed items are inclined to unpredictable shape distortions after forming and following cooling down to the room temperature.

Unoriented high-thick films (not thinner than 150 mµ) are conventionally used as 'bottom' films. Such films are usually sufficiently mechanically pliable (forming thereof into items is accompanied by molecular orientation of the film matter) and characterized by low values of heat shrinkage. However because of great thickness of the films their use is associated with a high polymeric material consumption. Attempts of the thickness reduction usually lead to excessive thinning of separate zones of the formed item wall, so that its thickness can achieve critically low values. In its turn, this causes a decrease of mechanical reliability and water vapor and gas-barrier characteristics. Therefore if the starting film is not enough thick, items made thereof often prove to be not sufficient strong to sustain mechanical stresses taking place during transport of these items filled by a content of food or other nature. In addition the package in whole has shortened shelf life for safe consumption, due to accelerated penetration of atmospheric oxygen thereinto.

The usage as a 'bottom' film of known from the prior art oriented films, which are subject to significantly less marked peak thinning in drawing, could solve the above problem. Such films are usually produced by biaxial orientational stretching with stretch ratios 2 to 3.5 both in machine and transversal direction with following dimensional relaxation (typically, with low shrinkage value of less than 10% in each direction). However, regardless of the layer composition such films are notable for very low mechanical pliability, so they trend to often breaks, being attempted to be thermoformed. Such breaks occur most frequently under the severe forming conditions. Besides, oriented films generally have high values of heat shrinkage, particularly at the product forming temperature, which may lead to significant distortions of the shape and dimensions of the formed product.

Also known are films with intermediate mechanical pliability characteristics obtained by extensive relaxation shrinkage of oriented film. In particular, U.S. Pat. No. 7,993,713 discloses a multilayer heat shrinkable film designed, inter alia, for deep-drawing into trays or containers. In the appropriate embodiment, such film containing coextruded layers of polyolefin, polyester and polyamide material is provided by means of biaxial orientation stretching at the draw ratios of 2.7 and 3.5 in the machine and in the transverse directions, respectively, and subsequent 20% relaxation shrinking in each direction, which corresponds to 36% surface shrinkage (the maximum claimed shrinkage being 40%). Such film comprises a layer formed of a polyamide resin, which is a blend of an aliphatic polyamide having a melting point of 210° C. or higher and an aromatic polyamide comprising isophthalic (I) acid and terephthalic (T) acid as acid components. Proper high-melting commercial aliphatic polyamides can be select from PA 6 and PA 66, which are inherently highly crystalline, and have a rather low value of elongation at break in their oriented state. Commercial aromatic copolyamides, comprising required acid component, e.g. copolyamide PA 6I/6T (with hexamethylenediamine as the amine component), have a very high glass transition temperature (about 130° C.) and are also rather rigid but absolutely amorphous. Addition of such copolyamides to aliphatic homopolyamides facilitates drawing to a certain extent due to reduction of the total crystallinity. However, as shown below, under the above severe conditions of forming, the films containing such polyamide blends do not possess sufficient mechanical pliability and plasticity, and are predisposed to frequent breaks.

Also known in the prior art are multilayer packaging films containing predominantly aliphatic copolyamides with reduced crystallinity degrees and melting points. Generally polyamide resins used for this purpose are copolymers of caprolactam, adipic acid and hexamethylenediamine, as well as co- or terpolymers containing units of at least one of the foregoing monomers, as well as units of another amino acid, e.g. w-aminodecanoic acid, another dicarboxylic acid, e.g. sebacic acid, or another diamine, e.g. dodecamethylenediamine. In this case the typically used resins are copolyamides, such as PA 6/66, and terpolyamides, such as PA 6/66/10. The films produced from such co- or terpolyamides usually have a high heat shrinkage value and can be used, for example, for the 'lidding' films. In particular, U.S. Pat. No. 6,699,549 describes a multilayer heat shrinkable film comprising, in one of its layers, such copolyamides as PA 6/66, PA 6/12 and PA 6/610/MXD6, or mixtures thereof. The film exhibits a hot water shrinkability of at least 20% at 90° C. in each direction, and a dry-heat shrinkability of at least 15% measured at 120° C., which makes it totally unsuitable for use as the bottom film.

Therefore, currently there is a need for barrier film with an improved formability, which, being originally of relatively low thickness, can be thermally transformed into mechanically reliable item with little or no trouble. In addition, the heat shrinkability of such thermoformable film must be as low as possible at the forming temperature.

Thus, the object of the present invention is to provide a barrier film for fabrication of trays or containers (bottom film) capable of high irreversible deformations at thermoforming by deep drawing under severe conditions, but not prone to excessive thinning-down in local areas, and having a very low shrinkage value at the forming temperature. Such film, having reduced starting thickness, would be suitable for making molded products with the desirable mechanical reliability, here understood as ability to endure transportation, after being filled with the packaged contents, practically with no ruptures.

Another object of the present invention is to provide a method for such film production.

DESCRIPTION OF THE INVENTION

Hereinafter, including the Claims, unless otherwise stipulated or unambiguously required by the context, the sign '%' shall mean the weight percentage based on the total weight of a composition or mixture (blend). Also, hereinafter a word comprising a parenthesized prefix shall denote a concept that simultaneously comprises concepts denoted by this word with this prefix and without it. For instance the word (co)polymer means simultaneously a polymer (homopolymer) and copolymer. Besides, the term 'copolymer', as well as relative terms, for instance, 'copolyamide' and 'copolyolefin' hereinafter means a product of copolymerization of two or more monomers. As the context may require, the terms 'polymer' and 'polymeric' may be unambiguously used in the narrow sense as relating to homopolymers.

BRIEF DESCRIPTION OF THE INVENTION

As a result of intensive studies carried out by the inventors, it was surprisingly found that the objects of the invention could be achieved by providing a coextruded biaxially-oriented and annealed flat barrier film comprising:

(i) at least one outer heat sealable layer, mainly made of a (co)polyolefin with the Vicat softening temperature not exceeding 130° C., (ii) at least one heat resistant layer, mainly made of at least one polar (co)polymer selected from the group comprising predominantly aliphatic (co)polyamides and aromatic (co)polyesters, (iii) at least one core adhesive layer made of a material capable of adhering to both (co)polyolefins and polar (co)polymers, wherein a. said heat resistant layer, mainly consisting of predominantly aliphatic (co)polyamides, comprises not less than 15% of at least one predominantly aliphatic copolyamide with the melting temperature not above 205° C.;

b. shrinkage value of the film in each of machine and transverse directions after immersion for 10 seconds in water at the temperature of 90° C. is less than 10%;

c. shrinkage value of the film in at least one of machine and transverse directions is less than 3% after dwelling for 10 seconds in a drying cabinet preheated to 100° C.;

d. the film is thermoformed practically free of ruptures, and the ratio between the mean thickness in the unstrained film areas and the mean minimum thickness of the film in the resulting formed product is not more than 4.5, when vacuum thermoforming is carried out automatically by a thermoforming machine at preset temperature, heating time, forming time and vacuum system pressure of 100° C., 3 s, 2.5 s and 2 mm Hg, respectively, by means of a forming die with four molding cavities in the form of rectangular parallelepipeds, each with the overall dimensions of 147×143×50 mm and rounding edges with a radius of 20 mm, assembled in rectangular block with 18 mm gaps between the molding cavities in the machine direction and 15 mm gaps in the transverse direction.

The phrase 'practically free of ruptures' means that not less than 99% of the products thermoformed from the film under the severe conditions are undamaged. The same criterion (99% undamaged packages) applies to said formed products that are practically free of ruptures during transportation conditions.

Forming of the film into trays takes place at elevated temperatures, usually at 80-110° C. Standard methods for determination of the film tensile characteristics prescribe performance of the tests at room temperature. However, in the temperature range between 20 and 80° C., polymers undergo important phase transitions (glass/softening conversion in polyamide, partial melting of the crystalline phase in polyolefins) that radically change the properties of materials. For this reason, the critical behavior characteristics of films are determined by production tests under the severe conditions of deep drawing, as these are defined herein.

Another object of the present invention is achieved through the claimed method of production of the film, including the stages of coextrusion, biaxial stretching, annealing and winding-up of the produced film into a roll, wherein i. the area stretch ratio at biaxial drawing is not less than 8, and ii. the stage of annealing is accompanied by linear relaxation with linear shrinkage value more than 25% in at least one of the longitudinal (machine) and transverse directions, and by surface relaxation with the area shrinkage value more than 40%.

If the stretch ratio and/or the degree of following relaxation of the film are less than above specified values, the resulting film would not possess the above listed set of useful characteristics. For example, a film with an insufficient draw ratio—or, in the extreme case, totally unoriented would be prone to a marked peak thinning-down, while a film oriented, but insufficiently shrunk in the process of annealing, usually is not pliable enough to endure deep drawing.

On the other hand, the products formed from the invented film may have different shapes, with the dimensions greatly varying relative to the film plane (e.g., different lengths and widths of trays). In this case, the film should preferably be used in its anisotropic embodiment, whereby the film pliability differs depending on the direction, which is achieved by the levels of relaxation in the machine and in the transverse directions being different, up to complete absence of relaxation in either of the directions. However, the area shrinkage value at relaxation still should be sufficiently high.

DETAILED DESCRIPTION OF THE INVENTION

The heat sealable layer of the claimed film preferably contains at least one (co)polymer, predominantly comprising (i) monomeric units of ethylene or propylene and (ii) monomeric units of at least one of such monomers as α-olefin with a number of carbon atoms from 2 to 14, vinyl esters, esters of unsaturated carboxylic acids, unsaturated carboxylic acids or salts thereof, and the total quantity of said monomers (ii) does not exceed 40 mole %. Said vinyl esters are preferably represented by vinylacetate, unsaturated carboxylic acids—preferably acrylic acid or methacrylic acid, and their esters preferably contain residues of normal or branched alcohols with a number of carbon atoms from 1 to 6, and said salts preferably contain such cations as $Li^+$, $Na^+$, $Mg^{2+}$ or $Zn^{2+}$.

Said predominantly aliphatic copolyamide of said heat resistance layer having the melting temperature not exceeding 205° C. generally contains units of such monomers as γ-aminobutyric acid, δ-aminovaleric acid, ε-aminocaproic acid, ι-aminoundecanoic acid and κ-aminolauric acid, tetramethylenediamine, hexamethylenediamine, and dodecamethylenediamine, adipic acid, azelaic acid, sebacic acid and dodecanoic acid. In addition, its macromolecule can optionally comprise not more than 15% w/w of aromatic monomers, such as isophthalic acid, terephthalic acid, meta-xylylenediamine and para-xylylenediamine. When the heat resistant layer consists mainly of a (co)polyamide, it can additionally contain at most 85% of at least one predominantly aliphatic (co)polyamide with the melting temperature of above 205° C. and containing the same monomeric units. In particular, both types of said (co)polyamides forming part of the heat resistant layer can be selected, e.g., from PA 6, PA 9, PA 12, PA 66, PA 69, PA 6/9, PA 6/66, PA 6/69 and PA 6/66/610, provided that the composition satisfies the foregoing restriction on the mass fractions of the 'low-melting-point' and the 'high-melting-point' (co)polyamide.

The heat resistant layer can additionally comprise semi-aromatic (co)polyamides, such as PA 6I/6T and PA MXD6.

Said aromatic (co)polyester of said heat resistance layer is usually represented by polyethylene terephthalate, polyethylene terephthalate modified by glycols, polybutylene terephthalate, crystallizable copolymer of polyethylene terephthalate and polybutylene terephthalate, or any mixture of the foregoing (co)polymers.

The material of the adhesive layer is preferably a product of grafting of maleic anhydride onto a polyolefin predominantly containing monomeric units of propylene or ethylene.

The invented film can additionally contain at least one oxygen barrier layer, consisting mainly of EVOH with the content of ethylene usually not exceeding 50 mole %.

This film can also comprise at least one moisture-barrier layer consisting mainly of a material having a Vicat softening temperature above 100° C., preferably above 130° C., said material preferably being a crystallizable (co)polyolefin, mainly comprising monomeric units of propylene or ethylene. When said polyolefin predominantly comprises monomeric units of propylene, it can additionally comprise not more than 30 mole % of monomeric units of at least another unsaturated monomer, e.g. ethylene, butylene, hexene, octene or vinylacetate. When said polyolefin predominantly comprises monomeric units of ethylene, it can additionally comprise not more than 30 mole % of monomeric units of at least another unsaturated monomer, e.g. propylene, butylene, hexene, octene or vinylacetate.

Generally the invented film can comprise from 3 to 25 layers. At least one of the heat resistant layers, provided that it comprises mainly polyamide, can directly border on a layer consisting of EVOH. One of the outer layers must be heat sealable, whereas the second outer layer can be either heat resistant or moisture barrier.

Typically, at least one of said adhesive layers directly contacts by one of its surfaces with a heat resistant or oxygen barrier layer, and by its other surface with a moisture barrier or heat sealable layer. Said adhesive layer can also be placed between a heat resistant layer based on an aromatic (co)polyether and an oxygen barrier or another heat resistant layer based mainly on an aliphatic (co)polyamide.

As regards the process for production of the invented film, various equipment can be used, subject to observance of the described basic process parameters.

For example, the film can be coextruded through a flat die, whereas the operations of stretching and annealing with relaxation of such flat film can be effected by means of a tenter and two pairs of nip rollers. The most preferable method here is to use a system for simultaneous biaxial stretching and simultaneous biaxial relaxation.

In another embodiment, coextrusion is performed by injection molding of the primary tube through an annular die. The operation of stretching is carried out by gas blowing of the primary tube with simultaneous longitudinal stretching of the film by means of two pairs of nip rollers to produce the secondary tube. Subsequent annealing and relaxation of the secondary tube is achieved by reduction of the gas pressure in the tube and applying of a controllable reduced tension created by two other pairs of nip rollers. Gas pressure in the tube can be reduced even down to atmospheric, and in this case the flattened tube is subjected to annealing. In yet another embodiment, the tubular film is brought to such flattened form by collapsing and flattening of the blown tube. The flattened tubular film produced by such method is then cut into the required number of sections, each of which is a resulting flat film to be wound-up into a separate roll.

Test Methods

Method of Determination of the Maximum Film Thinning Under the Severe Conditions of Thermoforming The method described below is developed for determination of the ratio between the mean thickness in the unstrained film areas and the mean minimum thickness of the film in the formed product. This ratio will be further referred to as 'the maximum film thinning under the severe thermoforming conditions' or, briefly, as 'the maximum thinning'. Its value is determined for formed products manufactured under factory conditions on a Multivac R145 thermoformer made by Multivac Group by means of a forming die with four molding cavities in the form of rectangular parallelepipeds, each with the overall dimensions of 147×

143×50 mm and rounding edges with a radius of 20 mm, assembled in rectangular block with 18 mm gaps between the molding cavities the machine direction and 15 mm gaps in the transverse direction. The following forming parameters are preset: temperature 100° C., heating time 3 s, forming time 2.5 s, and vacuum system pressure 2 mm Hg.

Film thermoforming under the severe conditions is carried out without loading into the machine of the product to be packaged and without the lidding film. After cutting of the film at the outlet in the corresponding section of the machine, formed blocks are obtained, each containing 4 trays of the foregoing geometry (see the projection in FIG. 1). After fabrication of about 500 of such blocks, which ensures a steady operating mode of the machine, 6 formed blocks are taken as samples, one after every 35 blocks, as these come out of the machine.

The mean thickness in the unstrained film areas is found by averaging the thicknesses within the selected confidence range obtained by rejection of the three maximum and the three minimum results of thickness measurement. Thickness in said 6 blocks is measured at each 30 mm, stepping back 4-5 mm from the block separation line. This film area is virtually free of strain in the course of forming. The minimum thickness is found for the same blocks in the tray corners, by cutting each tray along the vertical ribs and continuously moving the measurement pad of the micrometer in the vicinity of the cuts. The recorded minimum film thickness values for the four corners in each of the twenty-four trays are averaged by the same method (by 90 measurements within the selected confidence range).

The maximum thinning is calculated as the ratio between the mean thickness values found in the unstrained film areas and the mean minimum thickness in the products.

Methods of Shrinkage Determination

Hot water shrinkage is measured by the method described in U.S. Pat. No. 7,993,713, i.e. by immersion of the tested film sample, marked at 100 mm intervals in the machine direction and in the transverse direction, in water at the temperature of 90° C. for 10 seconds.

Dry-heat shrinkage is measured by placing an identical film sample in a drying cabinet, preheated to 100° C., for 10 seconds followed by air cooling of the sample to room temperature. Measurement of the shrinkage, as in the foregoing method, is made in the same manner for 10 samples, and then the mean value is calculated.

DESCRIPTION OF THE FIGURES USED TO DISCLOSE THE INVENTION

EXAMPLES OF THE INVENTION EMBODIMENTS

Figure 1:
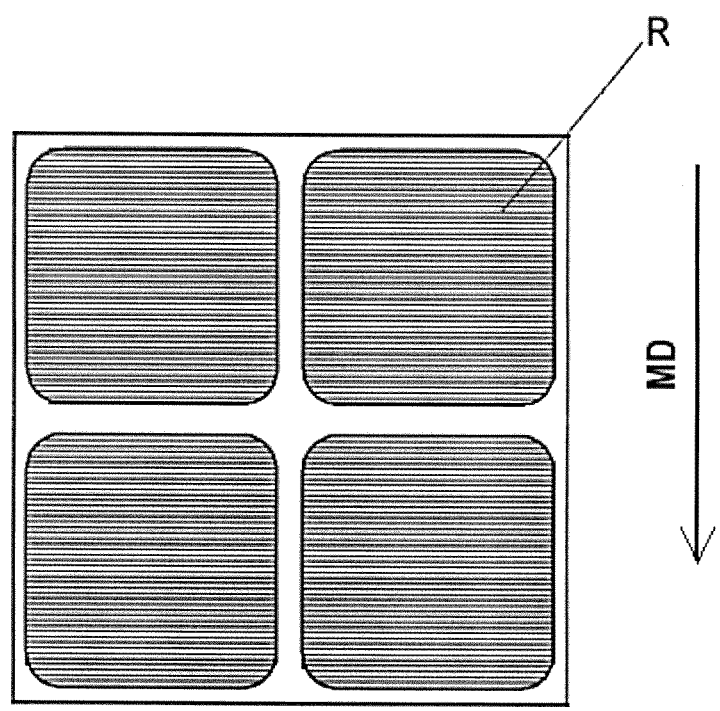
FIG. 1 shows a top view of the test forming cavity projected against the film. The arrow shows the machine direction (MD) of the film.
Figure 2:
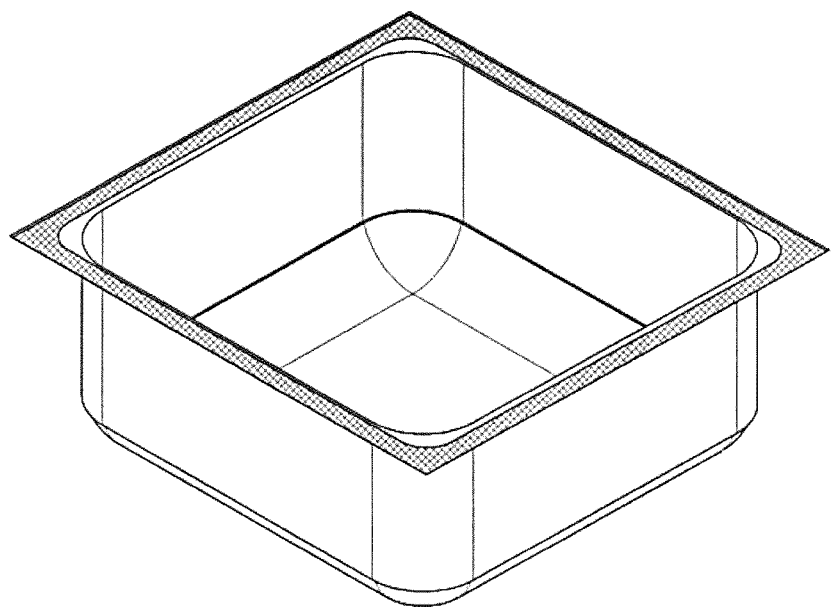
FIG. 2 shows a general view of the product formed from the film (idealized view).

The following examples, provided exclusively as illustration of the present invention, without limitation of spirit and scope of claims, disclose the most preferable embodiments of the present invention.

Materials Used in the Examples and their Abbreviations

Polyamides

PA 6—pelletized semicrystallinepolycaprolactam—polyamide 6—Ultramid® B3 grade supplied by BASF.

PA 6/66—pelletized semicrystalline copolymer of caprolactam, adipic acid and hexamethylenediamine—copolyamide 6/66—(PA 66 monomer content about 15%), Ultramid® C3 grade supplied by BASF.

PA 6I/6T—pelletized amorphous copolymer of hexamethylenediamine, terephthalic and isophthalic acids (copolyamide 6I/6T)—Selar® PA grade supplied by DuPont de Nemours.

PA-AB—pelletized masterbatch to prevent adhesion in the film wound into a roll (antiblock additive), for polyamide 6—Polybatch AB PA 3013 grade supplied by A. Schulman.

Polyesters

PET—pelletized semicrystalline polyethylene terephthalate, Lighter C93 grade supplied by Equipolymers GmbH.

PET-AB—pelletized antiblockmasterbatch for PET, Polybatch PT AB 050 G grade supplied by A. Schulman.

Polyolefins

POP1—pelletized polyolefin plastomer (copolymer of ethylene and α-olefin), Queo 0201 grade supplied by *Borealis* AG.

POP2—pelletized polyolefin plastomer (copolymer of ethylene and α-olefin), Exact® Plastomer 5062 grade supplied by Exxon Mobile.

coPP—pelletized random copolymer of propylene, ethylene and butene, Adsyl 5C30F grade supplied by Lyondell Basell.

IO—pelletized polyolefin ionomer (copolymer of ethylene and acrylic acids, partially zinc-neutralized), Surlyn 1601 grade supplied by DuPont de Nemours.

PE-AB—pelletized antiblock masterbatch for low density linear polyethylene, Polybatch FSU 1010E grade supplied by A. Schulman.

Gas Barrier Materials

EVOH—pelletized copolymer of ethylene and vinyl alcohol with the mole content of ethylene at 32%, Evasin 3251 F grade supplied by Chang Chun Petrochemical Co. Ltd.

Polymer Adhesives

AD1—pelletized maleinized linear low density polyethylene, Modic® M603E grade supplied by Mitsubishi Chemical Europe GmbH.

AD2—pelletized maleinized copolymer of ethylene and an acrylate, Bynel 21E787 grade supplied by DuPont de Nemours.

Example 1. Film with Practically Isotropic Pliability

Nine compositions shown in the corresponding column of Table 1 are loaded into nine extruders with different weight productivities of nine-layer extrusion machine, melted and mixed therein. Then the melts are fed to a nine-layer die, where a nine-layer extrudate is formed, wherein Layer A is the inner layer, and Layer I is the outer layer. Next, it is extruded through an annular die to form the primary tube, which is quenched by cold water down to a temperature of 13-15° C.

The solidified primary tube with the average diameter of about 310 mm and the average thickness of 447 μm is then transferred, by means of a system of active nip rollers, to a tubular infrared heater, where it is heated to the temperature of 80° C., and further subjected to orientation stretching with the MD and TD draw ratios of 2.85 and 3.2, respectively. Subsequent annealing of the produced oriented tubular film in the form of air-inflated tertiary tube is carried out in tubular convection heaters during 3-5 seconds, the temperature of the tertiary tube at the heater outlet being 135-140° C. In the process of annealing, adjustment of the rotational speed of the inlet and the outlet pairs of active nip rollers constraining the tertiary bubble, and maintenance of the bubble diameter at 705 mm provide for 30% dimensional relaxation (shrinkage) of the film in both directions. The parameters of drawing and shrinkage during relaxation step are given in Table 2. After annealing, the collapsed tubular film is passed over the cooling roller to bring the temperature down to 25° C., and is then wound-up into a roll containing about 1,000 m of film. The resulting film has the mean diameter of about 695 mm (flat width about 1,092 mm) and a thickness of about 100 μm.

In the process of the roll rewinding, four parallel blades cut off the flat tubular film so as to detach about 10 mm of the film material from the fold lines and simultaneously cut the film into 6 prolonged sheets in the form of three double strips, each about 357 mm wide. Then each of the resulting sheets is wound up in a separate roll.

After that the film is delivered to meat processing facilities, where it is used as the bottom film for the fabrication of:

a. trays for frankfurter-type sausage packaging, by means of a forming die shown in FIG. 1, with the use of a Multivac R145 thermoformer supplied by Multivac Group (film surface area occupied by the formed products ~71%) under the conditions described in the foregoing method of determination of the maximum thinning;

b. containers for packaging of whole chicken weighing about 1.2-1.4 kg, by means of a forming die measuring 220×300×120 mm, with the use of a Webomatic APS ML 4600 packaging machine, at transverse intervals of 80 mm (film surface area occupied by the formed products ~62%).

In both cases the following forming parameters are preset on control panels of the thermoformers: temperature 100° C., preheating time 3 s, forming time 2.5 s and vacuum system pressure 2 mm Hg.

The resulting packages are loaded into a refrigerated truck for delivery to a chain shop located at a distance of 20 km from the meat processing facility. Upon arrival at the place of destination, all packages are unloaded and inspected for damages, and records are made of the percentage of packages with ruptured film.

The results of production tests of this film and of the films from other examples are shown in Table 3.

TABLE 1

| | Example 1 and comparative examples 3, 4*, 6 | | Examples 2 and 7, comparative example 5 | |
|---|---|---|---|---|
| Layer | α**, % | Composition, % | α**, % | Composition, % |
| A | 10 | PET (98) + PET-AB (2) | 15 | PA 6 (68) + PA 6/66 (20) + PA 6I/6T (10) + PA-AB (2) |
| B | 5 | AD 1 (100) | 5 | AD 2 (100) |
| C | 30 | coPP (100) | 30 | coPP (100) |
| D | 5 | AD 2 (100) | 5 | AD 2 (100) |
| E | 8 | PA 6 (70) + PA 6/66 (20) + PA 6I/6T (10) [PA 6 (70) + PA 6I/6T (30)] | 11 | PA 6 (70) + PA 6/66 (20) + PA 6I/6T (10) |

TABLE 1-continued

| | Example 1 and comparative examples 3, 4*, 6 | | Examples 2 and 7, comparative example 5 | |
|---|---|---|---|---|
| Layer | α**, % | Composition, % | α**, % | Composition, % |
| F | 4 | EVOH (100) | 5 | AD 2 (100) |
| G | 8 | PA 6 (70) + PA 6/66 (20) + PA 6I/6T (10) [PA 6 (70) + PA 6I/6T (30)] | 4 | EVOH (100) |
| H | 5 | AD 2 (100) | 5 | AD 2 (100) |
| I | 25 | POP1 (98) + PE-AB (2) | 20 | IO (98) + PE-AB (2) |

*for Comparative Example 4, the composition of polyamide layers E and G is shown in square brackets
**αshare of the extruder productivity in the total productivity of the whole unit.

Example 2. Film with a Strong Anisotropy of Pliability

The first stage of production thereof is the extrusion of primary tube with the structure shown in Table 1 for Example 2, the diameter of 362 mm and the thickness of 492 μm.

Here and in the next examples, tubular films are made according to the technology of Example 1 with the end diameter and thickness as in this Example (1), but with the stretching and relaxation shrinkage as shown in Table 2. Accordingly, they have the same diameter (flat tube width) as in Example 1; the tube is cut into the same number of flat sheets as in Example 1, and subjected to the same tests as in Example 1; the test results are shown in Table 3.

Example 3 (Comparative). Film Oriented and Insufficiently Strongly Shrunk During Relaxation The first stage of production thereof is the extrusion of primary tube with the structure shown in Table 1 for Example 3, the diameter of 248 mm and the thickness of 639 μm. Subsequent operations are carried out as in Example 2.

TABLE 2

| Example No. | Draw ratio | | | Shrinkage during relaxation, % | | |
|---|---|---|---|---|---|---|
| | MD | TD | Surface | MD | TD | Surface |
| 1 | 2.85 | 3.2 | 9.12 | 30 | 30 | 51 |
| 2 | 2.85 | 3.2 | 9.12 | 10 | 40 | 46 |
| 3 c.e. [1] | 2.85 | 3.5 | 9.98 | 20 | 20 | 36 |
| 4 c.e. | 2.85 | 3.2 | 9.12 | 30 | 30 | 51 |
| 5 c.e. | 2 | 3.5 | 7 | 5 | 30 | 33.5 |
| 6 c.e. [a] | no stretching | | | no relaxation | | |
| 6 c.e. [b] | no stretching | | | no relaxation | | |
| 7 | 4 | 3.5 | 14 | 40 | 30 | 58 |

[1] c.e.—comparative (example)
[a, b] films differ in the mean thickness - 100 and 150 μm, respectively.
[c] Surface shrinkage during relaxation $\alpha_s$ in % is calculated as follows
$\alpha_s = 100 (1 - (1 - \alpha_{md}/100) \times (1 - \alpha_{td}/100)) = \alpha_{md} + \alpha_{td} - \alpha_{md} \times \alpha_{td}/100$, where $\alpha_{md}$ and $\alpha_{td}$ is linear shrinkage during relaxation in the machine direction and in the transverse direction, respectively.

Example 4 (Comparative). Film Containing Only High-Melting-Point Polyamides

The first stage of production thereof is the extrusion of the primary tube with the structure shown in Table 1 for Example 4 [the composition of the polyamide layers is shown in square brackets] and the geometric parameter as in Example 1. Subsequent operations are carried out as in Example 1.

Example 5 (Comparative). Poorly Oriented Film

The first stage of production thereof is the extrusion of primary tube is extruded with the structure shown in Example 5, Table 1, with the diameter of 283 mm and thickness of 466 μm. Subsequent operations are carried out as in the Example 2.

Example 6 (Comparative). Unoriented Films. Variants a and b

Two film samples with the structure described in Example 1, the diameter of 695 mm and the thickness of 100 μm (Variant a) and 150 μm (Variant b) are prepared by the well-known method of blown tube coextrusion. The melted tubular extrudate is air-blown immediately after it emerges from the annular die to form a bubble with a diameter of about 700 mm, which is then cooled in a cold air flow and wound-up into a roll. The film thickness is varied by changing the overall capacity of the unit (with preservation of the capacity ratios of the separate extruders).

Subsequent operations with the resulting tubular films are carried out an in Example 2.

Example 7. Flat-Die Extruded Films Subjected to Subsequent Tenter Stretching and Relaxation Nine compositions shown in Table 1 for Examples 2, 5 and 7, are loaded, melted and mixed in nine extruders operating at different capacities. Then the melts are fed to a nine-layer die, where a nine-layer melt extrudate is formed. Next the material is extruded through a flat die 2,000 mm wide with a gap of 1.1 mm (1,100 μm) to form the melted primary sheet transferred to the cooling shaft at the temperature of 20° C., where the sheet is quenched down to the temperature of 25° C. in its transition from the melted state to the solid state. The thickness and width of the primary sheet is controlled by adjustment of the rotational speed of the first pair of active nip rolls, while maintaining the overall productivity of the extruder constant. Then the primary sheet 1,160-1,161 mm wide and 588 μm thick is reheated with preheated shafts to the temperature of 85° C. and transferred, through a system of rolls, to the tenter frame for simultaneous biaxial stretching and simultaneous biaxial relaxation. The tenter frame is used for the sheet stretching in the MD and TD directions with the draw ratios of 3.5 and 4, respectively. Then the stretched sheet is transferred, together with the clamps, to the heating zone through a system of rolls. There the sheet is heated to a temperature of 145-150° C. and subjected, by mutual convergence of the clamps in two directions, to controlled relaxation and shrinkage in the machine direction and in the transverse direction by 40% and 30%, respectively. After quenching with an air flow, the clamp-deformed edges of the prepared 100 μm thick sheet are trimmed, and the sheet proper is cut into 9 strips each about 357 mm wide, which are then wound-up into a roll.

Further tests of these films are carried out as in Example 1.

TABLE 3

| Film of Example No. | Average film thickness[1], mm | Max. thinning | Shrinkage, %[2] | | | | Tray forming reject rate, %[3] | | Minimum thickness of the chicken tray, μm | Percentage of chicken packages damaged in transportation, %[4] |
| --- | --- | --- | --- | --- | --- | --- | --- | --- | --- | --- |
| | | | in water at 90° C., 10 s | | in air at 100° C., 10 s | | frankfurters | chickens | | |
| | | | MD | TD | MD | TD | | | | |
| 1 | 100 | 4.4 | 1 | 1 | 1 | 1 | 1 | 0 | 35 | 0 |
| 2 | 100 | 4 | 1 | 2 | 0 | 1 | 1 | 0 | 39 | 0 |
| 3 c.e. | 100 | 3.8 | 15 | 16 | 13 | 14 | 10 | 2 | 41 | 0 |
| 4 c.e.[5] | 100 | 4.2 | 1 | 1.5 | 0 | 0 | 25 | 8 | 37 | 0 |
| 5 c.e. | 100 | 4.7 | 6 | 0 | 2 | 0 | 38 | 11 | 33 | 15 |
| 6 c.e.[a] | 100 | 5.2 | 0 | 0 | 0 | 0 | 0 | 0 | 30 | 48 |
| 6 c.e.[b] | 150 | 4.9 | 0 | 0 | 0 | 0 | 0 | 0 | 47 | 1 |
| 7 | 100 | 4 | 1 | 0 | 0 | 0 | 2 | 0 | 39 | 0 |

[1]The thickness is roughly equal to the mean thickness in the unstrained areas
[2]MD and TD—machine direction and transverse direction of the film
[3]Percentage of ruptured trays
[4]Percentage relative to the number of originally intact trays
[5]Trays and containers from Comparative Example 4 are significantly deformed.

Tables 1, 2 and 3 show that the films made by the invented method can be thermoformed by deep drawing under the severe conditions practically free of ruptures, in contrast to the prior art oriented films. The invented films are not prone to excessive thinning in certain areas, as confirmed by the film maximum thinning values (not more than 4.5) in the formed products (soft trays or containers), and demonstrate a very low shrinkage (less than 3%) at the forming temperature, which provides for preservation of the shape preset at fabrication. The invented film is suitable, despite the reduced original thickness, for fabrication of mechanically strong products, which, notwithstanding the smaller mean thickness of the original film, display a greater mechanical strength than the unoriented films traditionally used for the purpose.

The invention claimed is:
1. A coextruded biaxially-oriented barrier film, comprising,
   (i) at least one outer heat sealable layer, comprising a (co)polyolefin with a Vicat softening temperature not exceeding 130° C.,
   (ii) at least one heat resistant layer, comprising at least one polar (co)polymer selected from the group consisting of (co)polyamides and aromatic (co)polyesters, and
   (iii) at least one core adhesive layer made of a material capable of adhering to both (co)polyolefins and polar (co)polymers, wherein
a. said heat resistant layer, if it consists essentially of (co)polyamides, comprises not less than 15% of at least one copolyamide with a melting temperature not above 205° C.;
b. a shrinkage value of the film in each a machine direction and a transverse direction after immersion for 10 seconds in water at a temperature of 90° C. is less than 10%;
c. a shrinkage value of the film in at least one of the machine direction and the transverse direction is less than 3% after dwelling for 10 seconds in a drying cabinet preheated to 100° C.; and
d. the film is capable of being thermoformed substantially free of ruptures, and the ratio between a mean thickness in unstrained film areas and a mean minimum thickness of the film in a resulting formed product is not more than 4.5, when vacuum thermoforming is carried out automatically by a thermoforming machine at a preset temperature of 100° C., a heating time of 3 s, a forming time of 2.5 s and a vacuum system pressure of 2 mm Hg by means of a forming die with four molding cavities in the form of rectangular parallelepipeds, each with the overall dimensions of 147×143×50 mm and rounding edges with a radius of 20 mm, assembled in a rectangular block with 18 mm gaps between the molding cavities in the machine direction and 15 mm gaps in the transverse direction.

2. The film according to claim 1, wherein said aromatic (co)polyester forming part of the heat resistant layer is selected from the group consisting of polyethylene terephthalate, glycol-modified polyethylene terephthalate, polybutylene terephthalate, crystallizing copolymer of polyethylene terephthalate and polybutylene terephthalate, and any mixture of the foregoing (co)polymers.

3. The film according to claim 1, wherein the adhesive layer material is a product of grafting of maleic anhydride onto polyolefin containing monomeric units of propylene or ethylene.

4. The film according to claim 1, wherein said film additionally has at least one EVOH oxygen barrier layer, comprising a polar copolymer of ethylene and vinyl alcohol, whereby the ethylene content is not higher than 50 mole %.

5. The film according to claim 1, wherein said film additionally has at least one moisture barrier layer comprising an olefin (co)polymer.

6. The film according to claim 1, wherein said film additionally has at least one heat resistant layer comprising aliphatic (co)polyamide, which is a core layer.

7. The film according to claim 1, wherein said film comprises from 3 to 25 layers.

8. The film according to claim 1, wherein said heat sealable layer contains at least one (co)polymer, comprising
(i) monomeric units of ethylene or propylene and
(ii) monomeric units of at least one of the monomers selected from the group consisting of α-olefin with a number of carbon atoms from 2 to 14, vinyl esters, esters of unsaturated carboxylic acids, unsaturated carboxylic acids and salts thereof,
whereby a total quantity of the monomers (ii) does not exceed 40 mole %.

9. The film according to claim 8,
wherein said vinyl esters are represented by vinylacetate, and
wherein said unsaturated carboxylic acids are selected from the group consisting of acrylic acid and methacrylic acid, whereas their esters contain residues of normal or branched alcohols with a number of carbon atoms from 1 to 6, and said salts contain cations, selected from the group consisting of Li+, Na+, $Mg^{2+}$, and $Zn^{2+}$.

10. The film according to claim 1, wherein at least one of said copolyamide of said heat resistance layer having the melting temperature not exceeding 205° C. contains monomeric units of such amino acids as comprises units of monomers selected from the group (i) consisting of γ-aminobutyric acid, δ-aminovaleric acid, ε-aminocaproic acid, ι-aminoundecanoic acid, κ-aminolauric acid, tetramethylenediamine, hexamethylenediamine, dodecamethylenediamine, adipic acid, azelaic acid, sebacic acid, dodecanoic acid, and optionally not more than 15% w/w of monomers selected from the group (ii) consisting of isophthalic acid, terephthalic acid, meta-xylylenediamine and para-xylylenediamine.

11. The film according to claim 10, wherein said heat resistant layer additionally contains not more than 85% of at least one (co)polyamide with a melting temperature of above 205° C., containing monomeric units of at least one monomer selected from the group (i) consisting of γ-aminobutyric acid, δ-aminovaleric acid, ε-aminocaproic acid, ι-aminoundecanoic acid, κ-aminolauric acid, tetramethylenediamine, hexamethylenediamine, dodecamethylenediamine, adipic acid, azelaic acid, sebacic acid and dodecanoic acid, and optionally not more than 15% w/w of monomers selected from the group (ii) consisting of isophthalic acid, terephthalic acid, meta-xylylenediamine and para-xylylenediamine.

12. The film according to claim 10, wherein said heat resistant layer additionally comprises semiaromatic (co)polyamides selected from the group consisting of PA 6I/6T and PA MXD6.

13. A method of preparation of a biaxially-oriented and annealed barrier film according to claim 1, including the stages of coextrusion, biaxial stretching, annealing and winding up into a roll, wherein
i. an area stretch ratio at biaxial stretching is not less than 8, and
ii. the stage of annealing is accompanied by relaxation with shrinkage value more than 25% in at least one of the machine direction and the transverse direction, and by surface relaxation with the area shrinkage value more than 40%.

14. The method according to claim 13, wherein said coextrusion is flat-die coextrusion of a flat film, whereas the stages of biaxial stretching, annealing and relaxation are carried out by means of a tenter frame.

15. The method according to claim 13, wherein
i. said coextrusion is injection molding of a primary tube through an annular die,
ii. said biaxial stretching is achieved by gas-blowing of the primary tube with simultaneous longitudinal drawing of the film by means of two pairs of nip rolls to produce a secondary tube,
iii. subsequent annealing and relaxation of the tubular film is carried out at a tube gas pressure lower, than that at production of the secondary tube, and at a controlled reduced tension created by two other pairs of nip rolls used for production of the resulting tube,
which is then collapsed into a flattened tubular film, and a ready-to-use film is obtained by cutting of said flat flattened tubular film into a desirable number of prolonged sheets.

* * * * *

UNITED STATES PATENT AND TRADEMARK OFFICE
CERTIFICATE OF CORRECTION

PATENT NO. : 11,235,503 B2  
APPLICATION NO. : 16/625651  
DATED : February 1, 2022  
INVENTOR(S) : Verin et al.

Page 1 of 1

It is certified that error appears in the above-identified patent and that said Letters Patent is hereby corrected as shown below:

On the Title Page

Item (73) Assignee:
"OBSCHESTVO S OGRANICHENNOI OTVETSTVENNOSTYU "PROIZVODSTVENNO-KOMMERCHESKAVA EIRMNA ATI ANTIR-PAK""
Should read:
--OBSCHESTVO S OGRANICHENNOI OTVETSTVENNOSTYU "PROIZVODSTVENNO-KOMMERCHESKAYA FIRMA "ATLANTIS-PAK"--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*